US009602200B2

(12) United States Patent
Eddy et al.

(10) Patent No.: US 9,602,200 B2
(45) Date of Patent: Mar. 21, 2017

(54) MULTIPLE WAVELENGTH OPTICAL ASSEMBLIES FOR INLINE MEASUREMENT OF OPTICAL POWER AND FIBER OPTIC NETWORKS

(71) Applicant: AFL Telecommunications LLC, Duncan, SC (US)

(72) Inventors: Dale Eddy, Gilford, NH (US); Scott Prescott, Belmont, NH (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/377,105

(22) PCT Filed: Feb. 6, 2013

(86) PCT No.: PCT/US2013/024815
§ 371 (c)(1),
(2) Date: Aug. 6, 2014

(87) PCT Pub. No.: WO2013/119589
PCT Pub. Date: Aug. 15, 2013

(65) Prior Publication Data
US 2015/0010302 A1    Jan. 8, 2015

Related U.S. Application Data

(60) Provisional application No. 61/595,942, filed on Feb. 7, 2012.

(51) Int. Cl.
*H04B 10/079* (2013.01)
*H04J 14/02* (2006.01)
*H04B 10/272* (2013.01)

(52) U.S. Cl.
CPC ..... *H04B 10/07955* (2013.01); *H04B 10/272* (2013.01); *H04J 14/02* (2013.01);
(Continued)

(58) Field of Classification Search
CPC . H04B 10/07955; H04B 10/272; H04J 14/02; H04J 14/0247; H04J 14/0252;
(Continued)

(56) References Cited

U.S. PATENT DOCUMENTS 5,926,590 A *  7/1999  Mao .................................. 385/24
6,839,164 B2 *  1/2005  Kosaka et al. ................. 359/349
(Continued)

FOREIGN PATENT DOCUMENTS

JP        2012-8116 A     1/2012

OTHER PUBLICATIONS

International Search Report for PCT/US2013/024815 dated Apr. 26, 2013.
Written Opinion for PCT/US2013/024815 dated Apr. 26, 2013.

*Primary Examiner* — Leslie Pascal
(74) *Attorney, Agent, or Firm* — Dority & Manning, P.A.

(57) ABSTRACT

An apparatus for measuring optical power including a first multiplexer/demultiplexer to split/combine an optical signal including a first wavelength and second wavelength; a second multiplexer/demultiplexer to split/combine an optical signal including the first wavelength and the second wavelength; a first tap photodetector coupled to the first and second multiplexer/demultiplexers and to a first measurement device; and a second tap photodetector coupled to the first and second multiplexer/demultiplexers and to a second measurement device.

16 Claims, 4 Drawing Sheets

(52) U.S. Cl.
CPC ...... *H04J 14/0247* (2013.01); *H04J 14/0252* (2013.01); *H04J 14/0282* (2013.01); *H04J 14/0201* (2013.01); *H04J 14/0227* (2013.01); *H04J 14/0265* (2013.01)

(58) Field of Classification Search
CPC .............. H04J 14/0282; H04J 14/0265; H04J 14/0201; H04J 14/0227
See application file for complete search history.

(56) References Cited

U.S. PATENT DOCUMENTS

| | | | |
|---|---|---|---|
| 8,971,700 B2* | 3/2015 | Sakamoto et al. | 398/20 |
| 2002/0012144 A1* | 1/2002 | Lin | H04J 14/02 398/87 |
| 2002/0131116 A1* | 9/2002 | Shimomura et al. | 359/124 |
| 2006/0072918 A1* | 4/2006 | Gerstel et al. | 398/83 |
| 2006/0198634 A1 | 9/2006 | Ofalt et al. | |
| 2007/0280695 A1* | 12/2007 | Li et al. | 398/135 |
| 2008/0175598 A1 | 7/2008 | Cho et al. | |
| 2010/0284060 A1 | 11/2010 | Nicholson | |
| 2010/0322622 A1 | 12/2010 | Shukunami et al. | |
| 2011/0026922 A1* | 2/2011 | Ota et al. | 398/70 |
| 2011/0150471 A1 | 6/2011 | Joyner et al. | |
| 2012/0328239 A1* | 12/2012 | Fuerst et al. | 385/20 |

\* cited by examiner

MULTIPLE WAVELENGTH OPTICAL ASSEMBLIES FOR INLINE MEASUREMENT OF OPTICAL POWER AND FIBER OPTIC NETWORKS

CROSS-REFERENCE TO RELATED APPLICATIONS

This application is based upon and claims the benefit of priority from U.S. Provisional Application No. 61/595,942, filed Feb. 7, 2012, in the United States Patent and Trademark Office, the disclosures of which are incorporated herein in its entirety by reference.

BACKGROUND

1. Field

The invention is related to an apparatus for measuring the power levels of an operating optical communications system, and more particularly to an apparatus for measuring the power levels in a passive optical network (PON), like those used in fiber to the 'X' (X: H=home, C=curb, N=node, P=premises, etc.) or CWDM (coarse wavelength division multiplexing) systems.

2. Related Art

Measuring the power levels of an operating optical communications system, specifically a passive optical network (PON), like those used in fiber to the 'X' (X: H=home, C=curb, N=node, P=premises, etc.) or CWDM (coarse wavelength division multiplexing) systems, requires the use of an inline power meter capable of sampling and measuring a small portion of the total optical power of each wavelength present in the optical fiber. (The fiber in an FTTx PON carries bidirectional traffic, with one or two wavelengths transmitted one direction, and a third wavelength transmitted in the reverse direction.) A number of methods already exist that use optical couplers with a 95:5, 90:10 or 80:20 split ratio to tap a portion of the desired signals from the fiber, split out the individual wavelengths of interest, detect and measure them. Such existing configurations may make use of a 2×2 coupler (see for example, U.S. Pat. No. 7,187,861) or a pair of 1×2 couplers (see for example, U.S. Pat. No. 7,756,418) to perform this function.

However, each stage needed to perform the steps just described contributes to the complexity of the optical assemblies required to tap and split out the optical signals while adding loss of signal level at each stage before detection and measurement, limiting the dynamic range of the measurement circuits. Also, these configurations can take up a considerable amount of space inside the instrument designed to measure the optical power levels, adding to the cost of those instruments.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

An embodiment of the invention is an apparatus for measuring optical power including a first multiplexer/demultiplexer to split/combine an optical signal including a first wavelength and second wavelength; a second multiplexer/demultiplexer to split/combine an optical signal including the first wavelength and the second wavelength; a first tap photodetector coupled to the first and second multiplexer/demultiplexers and to a first measurement device; and a second tap photodetector coupled to the first and second multiplexer/demultiplexers and to a second measurement device.

Other features of the embodiment may include the first and second multiplexer/demultiplexers being filter wavelength division multiplexer/demultiplexers.

Other features of the embodiment may include the first and second multiplexer/demultiplexers being arrayed wavelength grating multiplexer/demultiplexers.

Other features of the embodiment may include the first and second tap photodetectors being unidirectional/bidirectional inline tap photodetectors.

Other features of the embodiment may include the first and second measurement devices being transimpedance amplifiers and analog to digital converters.

Other features of the embodiment may include a first bandpass filter coupled between at least one of the first and second multiplexer/demultiplexers and the first tap photodetector; and a second bandpass filter coupled between at least one of the first and second multiplexer/demultiplexers and the second tap photodetector.

Other features of the embodiment may include the first and second tap photodetectors including an integrated bandpass filter.

Other features of the embodiment may include the first wavelength being one of at least 1310 nm, 1490 nm and 1550 nm; and the second wavelength being different than the first wavelength and one of at least 1310 nm, 1490 nm and 1550 nm.

Other features of the embodiment may include a third tap photodetector coupled to the first and second multiplexer/demultiplexers and to a third measurement device; and wherein the first and second multiplexer/demultiplexers split/combine an optical signal including a first wavelength, second wavelength and third wavelength.

Other features of the embodiment may include a third bandpass filter coupled between at least one of the first and second multiplexer/demultiplexers and the third tap photodetector.

Other features of the embodiment may include the third tap photodetector including an integrated bandpass filter.

Other features of the embodiment may include the first wavelength being one of at least 1310 nm, 1490 nm and 1550 nm; the second wavelength being different than the first wavelength and one of at least 1310 nm, 1490 nm and 1550 nm; and the third wavelength being different than the first and second wavelengths and one of at least 1310 nm, 1490 nm and 1550 nm.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
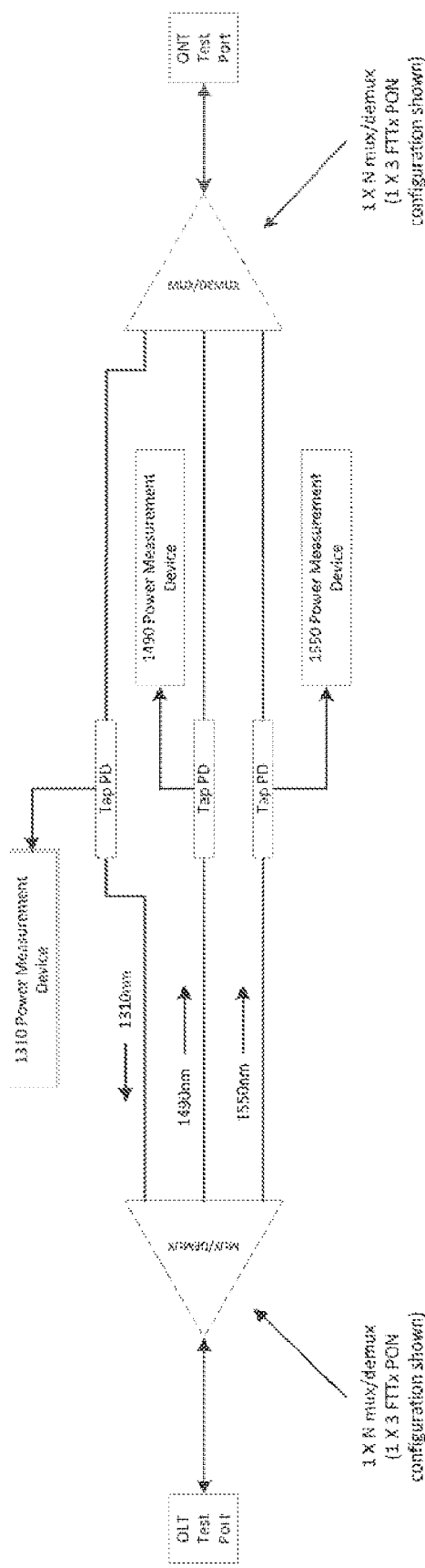
FIG. 1 shows an exemplary embodiment of an apparatus for measuring the power levels of an operating optical communications system.

FIG. 1 shows an exemplary embodiment of an apparatus for measuring the power levels of an operating optical communications system. It shows the apparatus being used in an unidirectional measurement PON configuration. Rather than splitting out a portion of the desired signals from the single fiber using the previously described method above, first and second multiplexers/demultiplexers, such as filter wavelength division multiplexers/demultiplexers (FWDM) or arrayed waveguide grating (AWG) multiplexers/demultiplexers, shown connected to an OLT Test Port and an ONT Test port, are used to split out the desired wavelengths (in FTTx PON systems it is usually three wavelengths—approximately 1310 nm, 1490 nm, and 1550 nm—though other PON, CWDM or other systems may use different wavelengths and/or more or fewer wavelengths). In FIG. 1, the multiplexers/demultiplexers shown are a 1×3 FTTX PON configuration. Other types of multiplexers/demultiplexers may also be used.

The split out wavelengths are each feed though a tap photodetector (Tap PD), such as a filtered unidirectional/bidirectional inline tap PD, one for each wavelength being measured. Other types of tap PDs could be used. The tap PD strips out a small portion of the signal passing through it (for example, approximately 5%) and detects the stripped out signal. This detected signal can then be amplified and measured in a measurement device (1310, 1490 and 1550 Power Measurement Devices). An example of a measurement device is a transimpedance amplifier (TIA) and analog to digital converter (ADC), that might be part of the measurement system of a PON meter. The power measurement devices may include signal processing and conditioning elements to ensure accurate measurement of the optical power level in each branch of the optical assembly. Other types of measurement devices or circuits could be used.

After passing through the tap PDs, the remainder of the signals are then recombined onto a single fiber using the other of the first and second multiplexers/demultiplexers.

The individual tap PDs can be configured to filter out any residual energy from the other wavelengths being measured, if needed. This can be achieved in several ways, such as by using an inline bandpass filter prior to the tap PDs in the signal chain (see, for example, FIG. 2; or a tap PD with an integrated bandpass filter. Both configurations perform the same function and offer similar performance.

Figure 2:
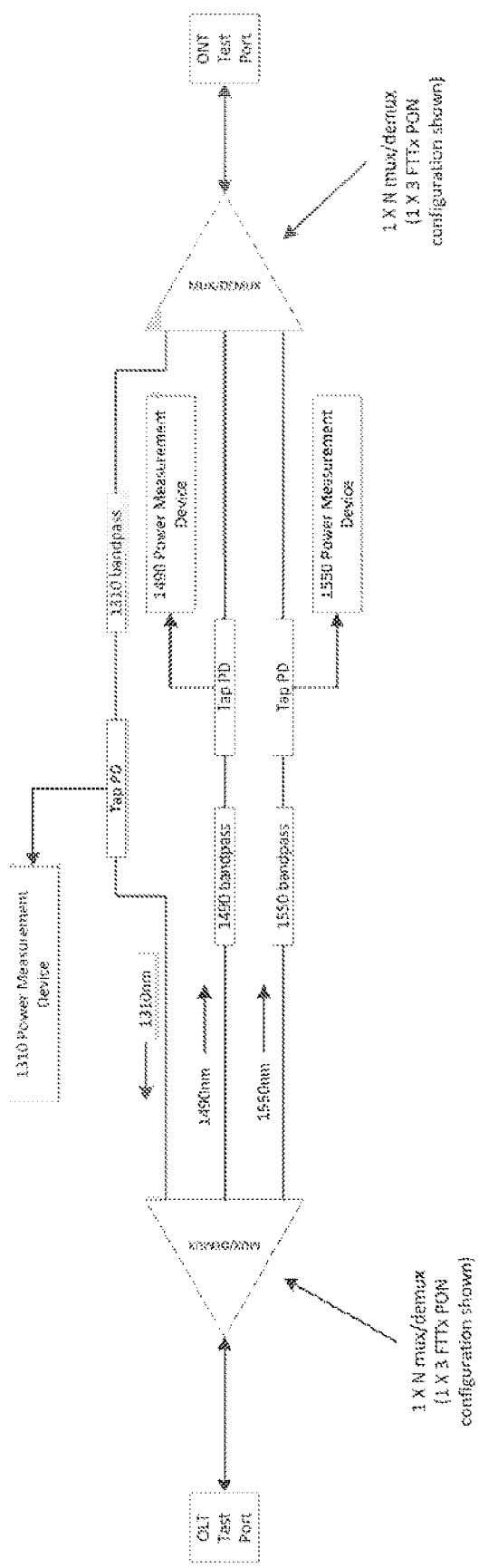
FIG. 2 shows another an exemplary embodiment of an apparatus for measuring the power levels of an operating optical communications system.
Figure 3:
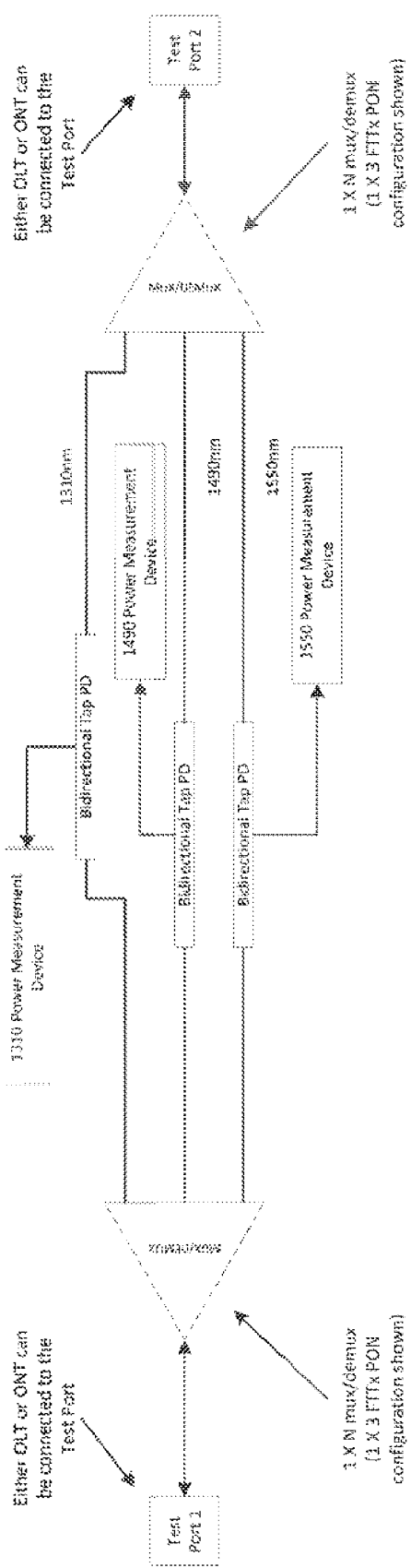
FIG. 3 shows another an exemplary embodiment of an apparatus for measuring the power levels of an operating optical communications system.
Figure 4:
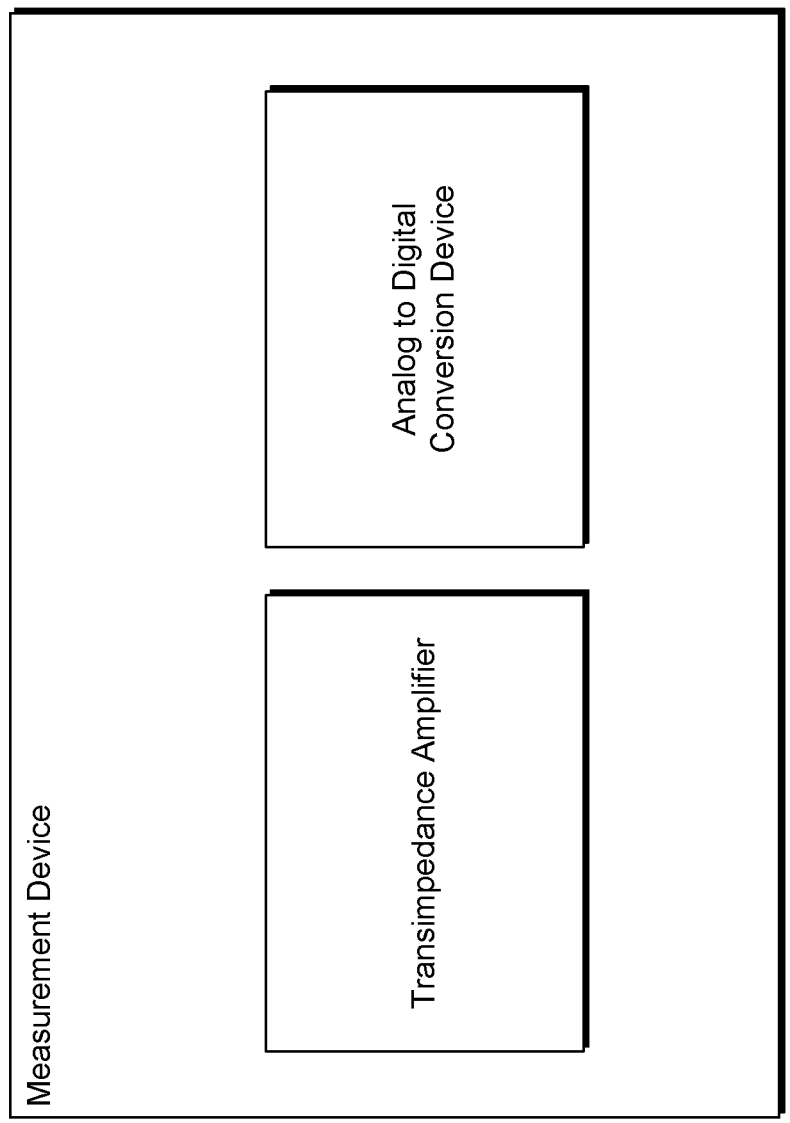
FIG. 4 shows an example measurement device that can be a part of a measurement system of a PON meter.

FIG. 2 also shows an embodiment of an exemplary apparatus in a unidirectional measurement PON configuration. FIG. 3 shows an embodiment of an exemplary apparatus in a bidirectional measurement PON configuration.

There are several advantages to using a FWDM/AWG and tap PD optical assembly, the biggest being a reduction in the number of optical components and optical splices required. This can lower the cost and reduce the space required to house the assembly in a test instrument.

Another is that when configured to do so, some integrated filter tap PDs can make bidirectional measurements. The need for designated test port connectors is eliminated with this configuration, making an inline PON and/or CWDM power meter using the configuration connection agnostic. FTTx PON meters usually have designated Optical Line Terminal (OLT) and Optical Network Terminal (ONT) connectors. If the connections are reversed a typical PON meter won't be able to detect the desired signals due to the optical configuration, though the PON network itself will function properly as the pass-through signals won't be affected by the reversed connections.

As mentioned above, although the exemplary embodiments described above are various apparatuses for measuring the power levels of an operating optical communications system, they are merely exemplary and the general inventive concept should not be limited thereto, and it could also apply to other types of apparatuses for measuring the power levels of an operating optical communications system.

What is claimed:

1. An apparatus for measuring optical power in a bidirectional optical network, the apparatus comprising:
a first combination multiplexer and demultiplexer component configured to multiplex/demultiplex between a first composite optical fiber and at least a first intermediate optical fiber and a second intermediate optical fiber, wherein the first intermediate optical fiber carries a first optical signal associated with a first wavelength in a first direction, and wherein the second intermediate optical fiber carries a second optical signal associated with a second wavelength in a second direction that is opposite to the first direction;
a second combination multiplexer and demultiplexer component configured to multiplex/demultiplex between a second composite optical fiber and at least the first intermediate optical fiber and the second intermediate optical fiber;
a first tap photodetector positioned along the first intermediate optical fiber;
a first bandpass filter positioned along the first intermediate optical fiber between the first combination multiplexer and demultiplexer component and the first tap photodetector;
a first measurement device configured to measure the first optical signal from the first tap photodetector;
a second tap photodetector positioned along the second intermediate optical fiber;
a second bandpass filter positioned along the second intermediate optical fiber between the second combination multiplexer and demultiplexer component and the second tap photodetector; and
a second measurement device configured to measure the second optical signal from the second tap photodetector.

2. The apparatus of claim 1, wherein said first and second combination multiplexer and demultiplexer components are each implemented as a filter wavelength division combination multiplexer and demultiplexer.

3. The apparatus of claim 1, wherein said first and second combination multiplexer and demultiplexer components are each implemented as an arrayed wavelength grating combination multiplexer and demultiplexer.

4. The apparatus of claim 1, wherein said first and second tap photodetectors are unidirectional inline tap photodetectors.

5. The apparatus of claim 1, wherein said first and second measurement devices are transimpedance amplifiers and analog to digital converters.

6. The apparatus of claim 1, wherein
said first wavelength is one of 1490 nm and 1550 nm; and
said second wavelength is 1310 nm.

7. An apparatus for measuring optical power in a bidirectional optical network, the apparatus comprising:
a first combination multiplexer and demultiplexer component configured to multiplex/demultiplex between a first composite optical fiber and at least a first intermediate optical fiber and a second intermediate optical fiber, wherein the first intermediate optical fiber carries a first optical signal associated with a first wavelength in a first direction, and wherein the second intermediate optical fiber carries a second optical signal associated with a second wavelength in a second direction that is opposite to the first direction;

a second combination multiplexer and demultiplexer component configured to multiple/demultiplex between a second composite optical fiber and at least the first intermediate optical fiber and the second intermediate optical fiber;

a first tap photodetector positioned along the first intermediate optical fiber;

a first measurement device operatively coupled to the first tap photodetector and configured to generate a first measurement of the first optical signal;

a second tap photodetector positioned along the second intermediate optical fiber; and a second measurement device operatively coupled to the second tap photodetector and configured to generate a second measurement of the second optical signal.

8. The apparatus of claim 7, further comprising:

a first bandpass filter positioned along the first intermediate optical fiber between the first combination multiplexer and demultiplexer component and the first tap photodetector; and a second bandpass filter positioned along the second intermediate optical fiber between the second combination multiplexer and demultiplexer component and the second tap photodetector.

9. The apparatus of claim 7, wherein each of the first tap photodetector and the second tap photodetector comprises a unidirectional inline tap photodetector.

10. The apparatus of claim 7, wherein each of the first tap photodetector and the second tap photodetector comprises a bidirectional inline tap photodetector.

11. The apparatus of claim 7, wherein the apparatus is connection agnostic such that it is operable regardless of whether the first combination multiplexer and demultiplexer is connected to an optical line termination connection or an optical network terminal connection.

12. An apparatus for measuring optical power in a bidirectional optical network, the apparatus comprising:

a first combination multiplexer and demultiplexer component configured to multiplex/demultiplex between a first composite optical and at least a first intermediate optical fiber, a second intermediate optical fiber, and a third intermediate optical fiber, wherein the first intermediate optical fiber carries a first optical signal associated with a first wavelength in a first direction, wherein the second intermediate optical fiber carries a second optical signal associated with a second wavelength in the first direction, and wherein the third intermediate optical fiber carries a third optical signal associated with a third wavelength in a second direction that is opposite to the first direction;

a second combination multiplexer and demultiplexer component configured to multiplex/demultiplex between a second composite optical fiber and at least the first intermediate optical fiber, the second intermediate optical fiber, and the third intermediate optical fiber;

a first tap photodetector positioned along the first intermediate optical fiber;

a first measurement device operatively coupled to the first tap photodetector and configured to generate a first measurement of the first optical signal;

a second tap photodetector positioned along the second intermediate optical fiber;

a second measurement device operatively coupled to the second tap photodetector and configured to generate a second measurement of the second optical signal;

a third tap photodetector positioned along the third intermediate optical fiber; and a third measurement device operatively coupled to the third tap photodetector and configured to generate a third measurement of the third signal portion of the optical signal.

13. The apparatus of claim 12, further comprising:

a first bandpass filter positioned along the first intermediate optical fiber between the first tap photodetector and the first combination multiplexer and demultiplexer component; and a second bandpass filter positioned along the second intermediate optical fiber between the second tap photodetector and the first combination multiplexer and demultiplexer component; and a third bandpass filter positioned along the third intermediate optical fiber between the third tap photodetector and the second combination multiplexer and demultiplexer component.

14. The apparatus of claim 12, wherein each of the first tap photodetector, the second tap photodetector, and the third tap photodetector comprises a bidirectional inline tap photodetector.

15. The apparatus of claim 12, wherein the apparatus is operable regardless of whether the first combination multiplexer and demultiplexer is connected to an optical line terminal connection or an optical network terminal connection.

16. The apparatus of claim 12, wherein said first wavelength comprises 1490 nm;

said second wavelength comprises 1550 nm; and the third wavelength comprises 1310 nm.

* * * * *